Apr. 3, 1923.

H. CAVE

NOVELTY ATTACHMENT FOR VEHICLES

Filed June 30, 1919

1,450,278

INVENTOR
Henry Cave.
BY Chapin & Neal
ATTORNEYS

Patented Apr. 3, 1923.

1,450,278

UNITED STATES PATENT OFFICE.

HENRY CAVE, OF HARTFORD, CONNECTICUT.

NOVELTY ATTACHMENT FOR VEHICLES.

Application filed June 30, 1919. Serial No. 307,666.

*To all whom it may concern:*

Be it known that I, HENRY CAVE, a citizen of the United States of America, residing at Hartford, in the county of Hartford and State of Connecticut, have invented certain new and useful Improvements in Novelty Attachment for Vehicles, of which the following is a specification.

This invention relates to novelty attachments for vehicles and has for its object to provide a miniature aeroplane with means for attaching it to a suitable part of a vehicle for vertical movement, so that, when the vehicle is in motion, the aeroplane is moved rapidly through the air and caused to rise to varying degrees according to the speed of the vehicle.

For the purposes of illustration, a single embodiment of the invention is shown in the accompanying drawing, in which—

Referring to these drawings: A represents a miniature aeroplane which may be of any suitable type. As shown, the aeroplane is of the biplane type, having upper and lower planes $p$ and $p'$, although this type of aeroplane is by no means essential and is given merely by way of illustrative example. The only essential, as far as the aeroplane is concerned, is that it have means whereby it will rise when it is moved rapidly through the air.

The aeroplane A, as illustrated, is provided with means for attaching it to the radiator cap C of an automobile D. It will be obvious, however, that the aeroplane may equally well be attached to many other parts of the automobile, or to any other vehicle, and the invention is therefore independent of the type of vehicle employed or the part of such vehicle to which the novelty is attached.

Figure 2:
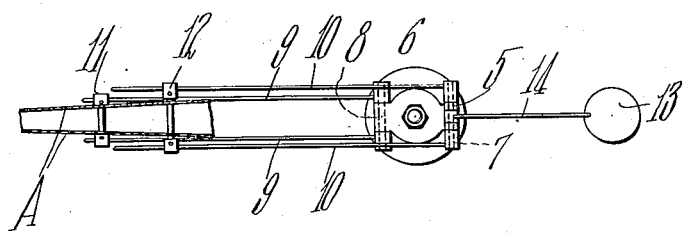
Fig. 2 is a fragmentary sectional plan view thereof.

As shown, there is secured to cap C, by means of a bolt 3, a bracket 4 which has front and rear ears 5 and 6 to receive pivot pins 7 and 8 respectively. A pair of arms 9 are mounted at one end, and on opposite sides of ear 6, on the pivot pin 8 and a like pair of arms 10 are similarly mounted on pin 7. The other ends of arms 9 and 10 are connected to aeroplane A at suitable points, as 11 and 12 respectively, the arms of each pair being disposed on opposite sides of the aeroplane body, as indicated in Fig. 2.

Preferably, the weight of the aeroplane is balanced by providing a counterweight 13 which is connected by an arm 14 to pin 7, such arm and the arms 10 being suitably fixed to pin 7.

Figure 1:
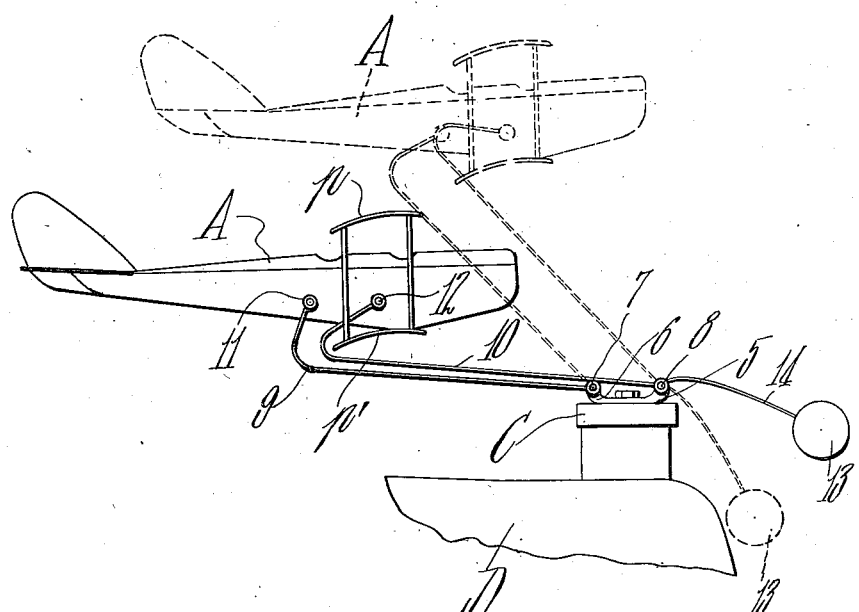
Fig. 1 is an elevational view of a device embodying the invention.

In operation, as the vehicle D moves, the aeroplane A is carried rapidly through the air and such air striking planes $p$ and $p'$ causes the aeroplane to rise, as shown by dotted lines in Fig. 1, and to varying degrees according to the speed of the vehicle.

Many other means of connecting the miniature aeroplane to a vehicle to permit the function described will readily occur to those skilled in the art, having for their object the use of invention in a form differing specifically from that disclosed. It is therefore desired to have the scope of the invention defined by the appended claims interpreted by the spirit of the disclosure rather than by the letter of the exact form disclosed.

What I claim is—

1. A novelty attachment for vehicles comprising a body portion provided with wings for raising the body when the vehicle is in motion, spaced axes on the body portion and on the vehicle, and parallel links connecting the axes on the body portion with the axes on the vehicle so that the body will be maintained substantially horizontal at all times and be constrained to move in an arcuate path as it rises and falls.

1. A novelty attachment for vehicles comprising a body portion provided with wings for raising the body when the vehicle is in motion, spaced pivot pins on the body portion and on the vehicle, and parallel links connecting the pins on the body portion with the pins on the vehicle so that the body will be maintained substantially horizontal at all times and be constrained to move in an arcuate path as it rises and falls, and means for counterbalancing the weight of the body portion.

3. A novelty attachment for road vehicles comprising a miniature aeroplane provided with wings extending outwardly therefrom for raising the aeroplane when the vehicle attains a given speed, and means for connecting the aeroplane to the vehicle comprising spaced pivot pins on the aeroplane and spaced pivot pins on the road vehicle, a pair of arms connecting the pins on the aeroplane with the pins on said vehicle, and means connected with certain of said arms for counterbalancing the weight of the aeroplane.

4. A novelty attachment for road vehicles comprising a miniature aeroplane provided with wings extending outwardly therefrom for raising the aeroplane when the vehicle attains a given speed, and means for connecting the aeroplane to the vehicle comprising spaced pivot pins on the aeroplane and spaced pivot pins on the road vehicle, a pair of arms connecting the pins on the aeroplane with the pins on said vehicle, one of said arms being extended beyond its pivotal connection with the vehicle, and a weight upon the extension of said arm for counterbalancing the weight of the aeroplane.

5. A novelty attachment for vehicles comprising a body portion provided with wings for raising the body relatively to the vehicle when the vehicle is in motion, a link pivotally connected at one end to said body portion and at the opposite end to said vehicle, and means cooperating with said link for maintaining the body portion in the same angular relation to the vehicle as it rises relatively thereto.

HENRY CAVE.